United States Patent [19]

Berta et al.

[11] 3,720,072
[45] March 13, 1973

[54] APPARATUS FOR THE RECOVERY OF HALOCARBONS
[75] Inventors: Remo Joseph Berta, Chappaqua; Peter Gordon Byrnes, Mahopac, both of N.Y.
[73] Assignee: Union Carbide Corporation, New York, N.Y.
[22] Filed: Feb. 26, 1971
[21] Appl. No.: 119,261

[52] U.S. Cl. ..................62/54, 62/200, 220/85 VR
[51] Int. Cl. ..................................................F17c 13/02
[58] Field of Search ....220/85 VR, 85 VS; 62/54, 62, 62/63, 64, 375, 376, DIG. 17, 199, 200, 514

[56] References Cited

UNITED STATES PATENTS

| | | | |
|---|---|---|---|
| 3,370,438 | 2/1968 | Hopkinson | 62/DIG. 17 |
| 3,605,428 | 9/1971 | Smith et al. | 62/64 |
| 3,421,336 | 1/1969 | Lichenberger et al. | 62/45 |
| 3,486,345 | 12/1969 | Waloin | 62/63 |
| 3,611,745 | 10/1971 | Schlemmer | 62/333 |

Primary Examiner—Meyer Perlin
Assistant Examiner—Ronald C. Capossela
Attorney—Paul A. Rose, Gerald R. O'Brien, Jr. and Aldo John Cozzi

[57] ABSTRACT

Method and apparatus are disclosed for the condensation of halocarbon vapors evolved at a heat transfer work site comprising: passing said vapors through a conventional primary condensation zone to condense the major portion of said vapors; and passing the uncondensed portion of said vapors to a secondary condensation zone in which substantially complete condensation is effected across a heat transfer barrier between said vapors and a low temperature liquified gas.

3 Claims, 3 Drawing Figures

INVENTORS
REMO J. BERTA
PETER G. BYRNES

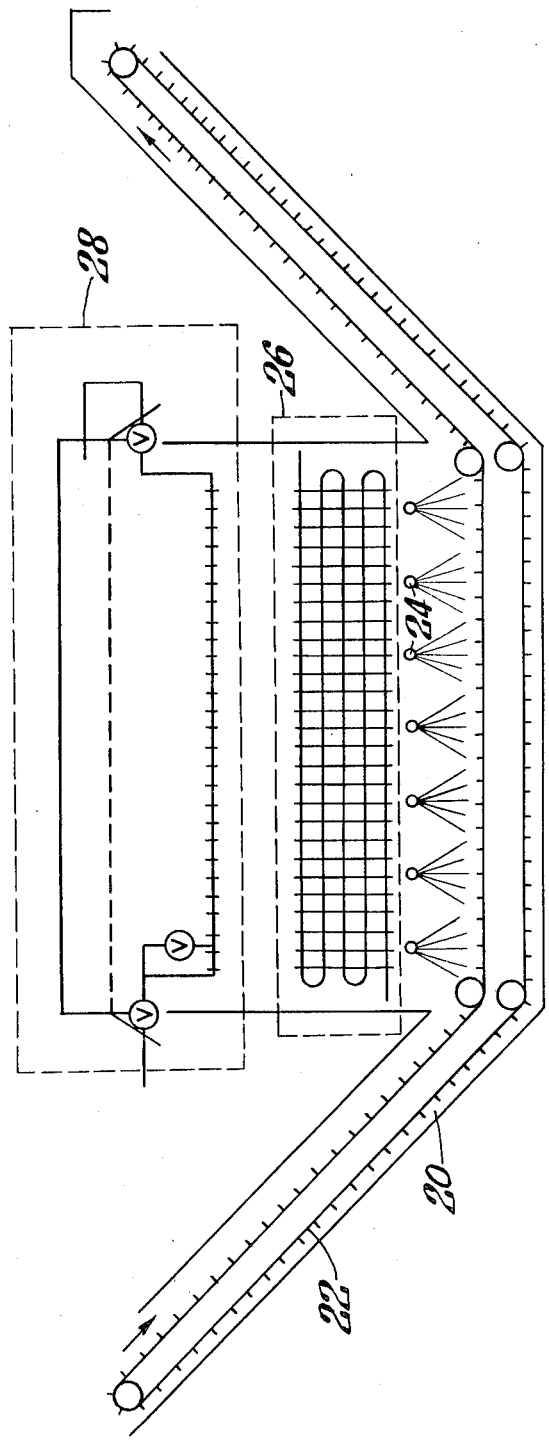

APPARATUS FOR THE RECOVERY OF HALOCARBONS

This invention relates to the recovery of the free vapors of halocarbons which are a class of chemicals that are considered to have relatively low standard boiling points. Hundreds of millions of pounds of these materials are produced annually, for a wide variety of uses. In the majority of uses of halogenated hydrocarbons, some form of recovery is employed because of economic considerations. Because of the quantities used, and the cost of the materials, it becomes economically necessary to maintain some form of vapor recovery system. In some such systems, the vapor recovery apparatus is as simple as a coil heat exchanger with water running through the coil. A portion of the halogenated hydrocarbon vapors simply condense on the outside of the water coil, and drip back into the open system. This concept is employed in degreasing equipment utilizing trichloroethylene and trichlorotrifluoroethane.

In more elaborate forms, the vapor recovery system employs such measures as, in succession: moderate compression; water-cooled condensation; further compression; more water-cooled condensation; high compression; more water-cooled condensation; and finally, further cooling, by refrigeration system, causing more condensation. An elaborate system such as this is employed in recovering the large quantities of dichlorodifluoromethane vapor used in wind tunnels.

Even though recovery systems are employed in many systems that use halogenated hydrocarbons, the recovery of the vapors is not complete. Incomplete recovery is caused by several factors, that operate individually, and/or in combination. The factors include: the presence or entrance of vapor contaminants that reduce the partial pressure of the desired vapor to such an extent that a portion of the desired vapor is rendered "non-condensable," at the operating temperature and pressure, at the desired condensation site; turbulence, or other disturbance, at or near the condensation site that causes the desired vapor to escape the system, uncondensed; diffusion of the vapor from a "condensable mixture" layer towards a lower vapor concentration "non-condensable mixer" layer; and, in certain types of operation, liquid and/or vapor is physically carried from the system.

An operation that is exemplary of the problems involved in the recovery of the free vapor of a low standard boiling point liquid is fluorocarbon food freezing. The freezing of food by the direct application of liquid dichlorodifluoromethane to the surface of the product has recently come into industrial application. As a method of removing heat from food products in order to effect freezing, the process, known as "fluorocarbon food freezing" is superior to most other methods of freezing with respect to: speed of freezing, reduction of moisture losses, and retention of product quality. However, fluorocarbon food freezing presently has economic disadvantages which include the fact that dichlorodifluoromethane is lost during the process and must be replaced.

The following is a brief description of the steps of the fluorocarbon food freezing process:

1. the unfrozen product is lowered into an open vessel (the freezer) containing both liquid and vapor dichlorodifluoromethane;
2. While within the freezer, the product is immersed in, and/or sprayed with, the liquid freezant;
3. At the product's surface, heat is transferred from within the product to the liquid dichlorodifluoromethane, generating dichlorodifluoromethane vapor;
4. A major portion of the generated vapor is condensed by a condenser located within the freezer's confines, above that level of generation;
5. The condensed freezant is recycled; and
6. After a suitable amount of heat has been removed from the product, such product is removed upward for further processing.

Because the freezant vapor is approximately four times as dense as ambient air, the fluorocarbon freezer is designed so as to have side walls to confine the dense freezant vapor. Upper areas of the freezer are left open so as to provide for ease of entry and exit of product, and to accommodate a change in freezant vapor volume that is generated by a change in product through-put rate. If the freezer were of a sealed design, the mechanics of product entry and exit would be, at best, difficult, and a change in product through-put rate would bring about an internal pressure fluctuation that could destroy the freezer. The condenser, that is designed to condense generated fluorocarbon vapor, is located in such a position that the vapor is condensed and returned to the system before it can overflow at the top of the freezer.

Although freezers are designed to minimize fluorocarbon vapor losses, losses do occur in the following ways:

1. by diffusion action
2. by dragging in air
3. by interface fluctuation
4. by sorption onto product
5. by dragging freezant out
6. by freezer overload.

It is, of course, to be understood that losses due to items (4) and (5) cannot be directly controlled.

The vapor pressure exerted by the fluorocarbon is independent of the presence of other vapors. In a fluorocarbon food freezer, the pressure exerted by the dichlorodifluoromethane vapor in equilibrium with the condenser, which is maintained at $-45°F.$, is approximately 8.2 psia. The remainder of the total pressure of 14.7 psia (normal atmosphere pressure) is made up of ambient air vapors that enter the open system. The pressure fraction of dichlorodifluoromethane is 0.556. Because pressure fractions equal volume fractions, the volume fraction of dichlorodi-fluoromethane is 0.556, or expressed another way: the total mixture is 55.6 volume percent dichlorodifluoromethane. 55.6 Volume percent dichlorodifluoromethane equals 84.3 weight percent dichlorodifluoromethane. Thus, a condenser operated at $-45°F.$ within a fluorocarbon food freezer will condense dichlorodifluoromethane vapor provided that its concentration exceeds 84.3 weight percent. When sufficient amounts of vapor have been condensed to reduce the fluorocarbon concentration to 84.3 weight percent, further condensation will not occur unless the concentration is increased. If the concentration of fluorocarbon vapor reaching the condenser is less than 84.3 weight percent, no condensation will occur. Because condensation does not occur, the fluorocarbon and air vapor mixture is termed "non-condensable."

As the concentration of dichlorodifluoromethane in air decreases, the temperature required for any condensation of fluorocarbon vapor also decreases. A temperature of −100°F. is necessary to reduce a dichlorodifluoromethane and air vapor mixture to a concentration of 10 volume percent dichlorodifluoromethane. A concentration reduction to 1.0 volume percent requires a temperature of −152° F., while a concentration reduction to 1.0 ppm by volume requires a temperature of −256°F.

In actual operation at capacity, the condenser located within a fluorocarbon food freezer will condense approximately 99.5 percent of the vapors generated in the process of extracting heat from the foods. Condensing continually occurs because vapors are being generated to such an extent that the concentration is constantly in excess of that concentration necessary to have condensation take place at the condenser. In other words, as some vapor is condensed, it is replaced by additional vapor that is generated below the condenser. Thus, as long as heat is being added to the dichlorodifluoromethane liquid, a "condensable" vapor concentration will be maintained, at some vicinity within the freezer. Nevertheless, loss of dichlorodifluoromethane vapor does occur.

The rate of loss is approximately 0.013 lb. of dichlorodifluoromethane vapor lost per pound of food that is frozen, while the freezer is processing food at a constant rate. When the rate fluctuates, an interface of "condensable" and "non-condensable" vapors alternately moves up and down within the freezer, acting as a pump to alternately bring in ambient air and push out non-condensable vapors. During a time of idling, the loss is approximately 0.26 lb. of vapor per hour for every level square foot of area accessible to vapor passage. Conventional dichlorodifluoromethane vapor losses from a commercial 20,000 lb./hr. capacity fluorocarbon food freezer amounts to approximately 1.5 million pounds per year having a value of about $450,000. Losses are encountered in other applications wherein halocarbons are employed.

Accordingly, it is the prime object of the present invention to provide method and apparatus for the more effective recovery of halocarbon vapors.

Other aims and advantages will be apparent from the following description.

In accordance with the present invention, a method and apparatus are provided for the condensation of halocarbon vapors evolved at a heat transfer work site comprising: passing said vapors through a conventional primary condensation zone to condense the major portion of said vapors; and passing the uncondensed portion of said vapors to a secondary condensation zone in which substantially complete condensation is effected across a heat transfer barrier between said vapors and a low temperature liquified gas.

As employed herein, the term "halocarbon" refers to the class of synthetic organic chemicals used widely in industrial heat transfer applications including: trichloroethylene, tetrachloroethylene, trichlorofluoromethane, dichlorodifluoromethane, bromotrifluoromethane, trichlorotrifluoroethane, and the like.

The term "conventional" primary condensation refers to any one of many currently commercial closed mechanical condensation (refrigeration) systems, such as an ammonia mechanical condensation system.

The term "low temperature liquified gas" refers to that class of gases and gas mixtures which boil at very low temperatures, such as nitrogen, air, oxygen, helium, argon and the other inert gas components of air. The term cryogenic is employed to characterize this class of gases. Such gases and gas mixtures boil at temperatures of about −300°F. The low temperature liquified gas can also be a gas such as carbon dioxide. Other gases having similar boiling temperatures below about −50°F. may also be employed. It should be noted that, while gaseous hydrogen, carbon monoxide and other hydrocarbon gases may be operably employed as the low temperature liquified gas in the process of the invention, their use is to be avoided due to the fact that their venting from the freezer to the atmosphere would constitute pollution or hazardous conditions.

In accordance with the apparatus aspect of the invention, apparatus for the recovery of the desired halocarbon is provided having, in combination with a heat transfer work site at which said liquids are boiled, primary condenser means for reliquifying the major portion of the boiled liquid and secondary condenser means comprising a condenser network for the passage of low temperature liquified gas therethrough in heat exchange with vapors of said halocarbon passing through said network. In addition, a shroud is preferably employed having means for effusing gasified low temperature gas from said shroud means to envelop said network; and conduit means between said network and said shroud means for conveying low temperature liquified gas gasified in said network to said shroud means for diffusion therefrom.

In the drawings:

FIG. 3 is a schematic elevational view of an over-all food freezing system employing secondary condenser apparatus of the embodiment of FIGS. 1 and 2.

Figure 1:
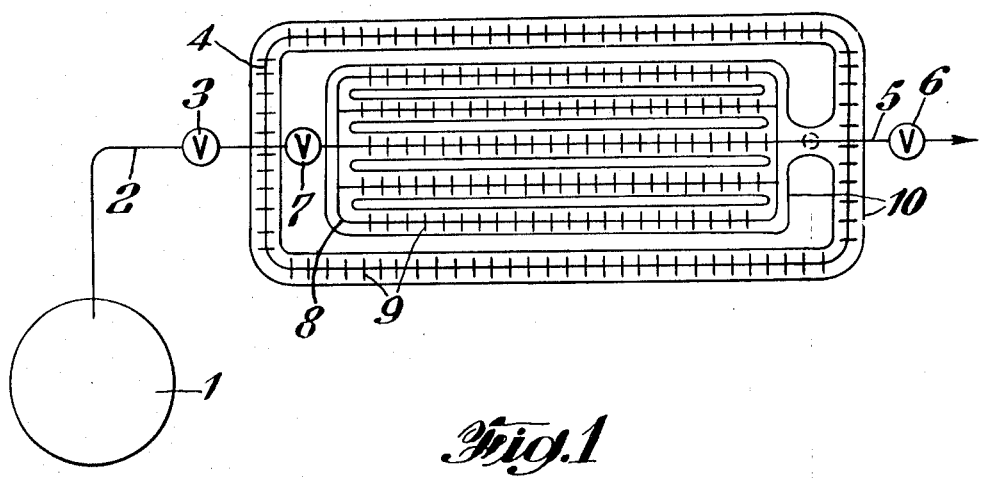
FIG. 1 is a schematic plan of view of secondary condenser apparatus embodying the invention.

Referring specifically to the secondary condenser apparatus of the drawings, a low temperature liquified gas, such as liquid nitrogen, is supplied from storage tank 1 through conduit 2 and valve 3 to perimeter condenser 4. Temperature sensor 5 activates modulated gas valve 6 which controls the total flow rate of liquid nitrogen through valve 3 and, when activated, valve 7. Valve 7 controls the flow of liquid nitrogen to standby condenser system 8 positioned within perimeter condenser 4. Valve 7 is actuated to open upon the indication of rise in condensable/non-condensable vapor interface within the freezer, remains open in case of freezer overload, and closes upon a lowering of said interface level. The standby condenser system 8 is employed when large amounts of halocarbon vapors are to be condensed. The perimeter and standby condenser tubes have a plurality of fins 9 mounted on their exterior surfaces.

Drain troughs 10 are suspended under the condenser tubes of both the perimeter condenser and standby condenser system and are joined to collect condensed halocarbon and channel it to a collection point 11 from which it passes through valve 12 to recycle.

Modulated gas valve 6 provides for a continuous flow of nitrogen vapor to pass through conduit 13 to vapor shroud 14, which fills with nitrogen vapor which effuses through the passages of effusion element 15 made of felt or foam. Nitrogen vapor passing from the effuser presents a gentle, low velocity nitrogen vapor which blankets the condenser systems 4 and 8 positioned below, thereby reducing icing conditions on the finned surface of the condensers. The continuous flow through valve 6 also acts to maintain the secondary condenser at a low temperature even in periods of low heat transfer demand.

Figure 2:
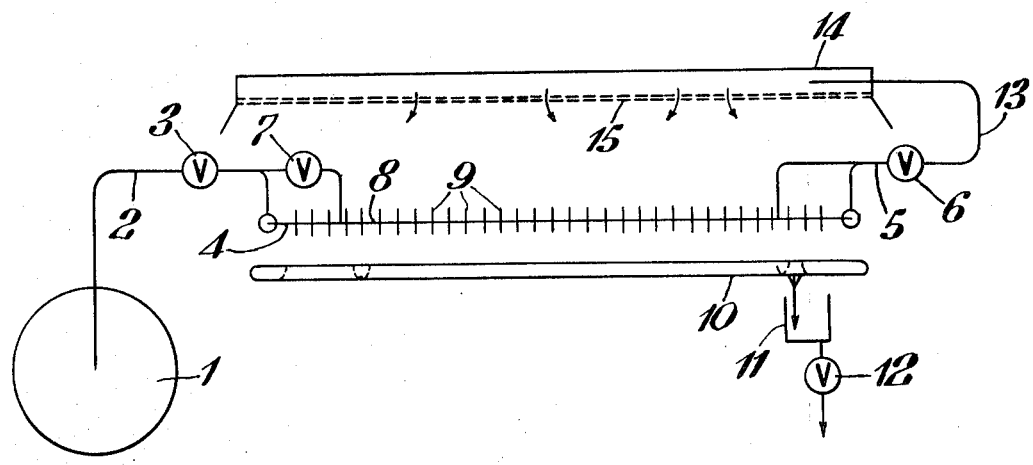
FIG. 2 is a schematic elevational view of the apparatus of FIG. 1.

Referring specifically to the freezer system 20 of FIG. 3 of the drawings, food to be frozen is fed to the conveyor system 22 at the left side and passes down under the liquid halocarbon spray emitted from jets 24 and, upon freezing, is carried by the conveyor out of the freezer at the right end. Halocarbon vapors generated in the food freezing section pass upwardly through the primary, mechanical condensation zone 26 where the major portion of the vapor is condensed and recycled to the freezer. Most of the halocarbon vapors not condensed by the primary condenser pass upwardly to the secondary recovery condenser zone 28 of the type shown in FIGS. 1 and 2 of the drawings. There, substantially all of the remaining halocarbon vapor within zone 28 is condensed and recycled to the freezer system.

In an example of operation for freezer system embodying the present invention, potatoes are fed to a freezer conveyor of the type shown in FIG. 3 of the drawings having a 6 ft. wide conveyor belt. The over-all length of the freezer is 40 ft., of which the freezer section is 20 ft. in length. The potatoes are fed at a rate of 15,000 pounds per hour and have a mean entrance temperature of 40°F. and a mean exit temperature of 0°F.

The halocarbon, UCON food freezant 12 (dichlorodifluoromethane) supplied by Union Carbide Corporation, vaporized in the freezing operation rises through the ammonia mechanical, primary condenser zone wherein the major portion is condensed and recycled to the food freezing operation. The mean temperature in the ammonia, mechanical primary condenser system is −45°F.

The uncondensed halocarbon vapor passes to the secondary recovery condenser system and is substantially completely condensed, collected and recycled to the food freezing operation as described hereinabove. The mean temperature of the liquid nitrogen in the storage vessel is −320°F., the mean liquid nitrogen temperature in the secondary recovery condenser is −200° F.; and the mean nitrogen vapor temperature in the shroud is about 0°F. The mean liquid halocarbon temperature during the freezing operation is −25°F.

What is claimed is:

1. Apparatus for the recovery of low boiling point liquids having, in combination with a heat transfer work site at which said liquids are boiled, primary condenser means for re-liquifying the major portion of the boiled liquids, secondary condenser means, and hood means positioned above said secondary condenser means for enclosing said condenser means, said secondary condenser means comprising a condenser network for the passage of low temperature liquified gas therethrough in heat exchange with rising vapors of said boiled liquids passing through said network, shroud means, having means for effusing gasified low temperature gas downwardly from said shroud means to envelop said network, and conduit means between said network and said shroud means for conveying low temperature liquified gas gasified in said network to said shroud means for effusion therefrom.

2. Secondary condenser apparatus for the condensation of halocarbon vapors comprising: a condenser network for the passage of low temperature liquified gas therethrough in heat exchange with vapors of said halocarbon passing through said network; shroud means having means for effusing gasified low temperature gas from said shroud means to envelop said network; and conduit means between said network and said shroud means for conveying low temperature liquified gas gasified in said network to said shroud means for effusion therefrom.

3. Apparatus in accordance with claim 2, wherein said condenser network comprises continuously-operating condenser means and standby condenser means responsive to the condensation demand of said apparatus.

* * * * *